US012633150B2

(12) United States Patent
Lin et al.

(10) Patent No.: US 12,633,150 B2
(45) Date of Patent: May 19, 2026

(54) METHOD FOR ADAPTIVELY ENCODING POSITIONS OF TEXTUAL OBJECTS IN A DOCUMENT

(71) Applicant: FMR LLC, Boston, MA (US)

(72) Inventors: Chen Lin, Belmont, MA (US); Mathew James Pazaris, Harvard, MA (US); Piush Kumar Singh, Ranchi (IN); Hui Su, West Roxbury, MA (US)

(73) Assignee: FMR LLC, Boston, MA (US)

( * ) Notice: Subject to any disclaimer, the term of this patent is extended or adjusted under 35 U.S.C. 154(b) by 326 days.

(21) Appl. No.: 18/374,760

(22) Filed: Sep. 29, 2023

(65) Prior Publication Data

US 2025/0111690 A1     Apr. 3, 2025

(51) Int. Cl.
| | |
|---|---|
| *G06V 30/19* | (2022.01) |
| *G06V 10/774* | (2022.01) |
| *G06V 30/14* | (2022.01) |
| *G06V 30/148* | (2022.01) |
| *G06V 30/413* | (2022.01) |
| *G06V 30/414* | (2022.01) |

(52) U.S. Cl.
CPC ...... *G06V 30/19193* (2022.01); *G06V 10/774* (2022.01); *G06V 30/1444* (2022.01); *G06V 30/153* (2022.01); *G06V 30/413* (2022.01); *G06V 30/414* (2022.01)

(58) Field of Classification Search
CPC .. G06V 30/153; G06V 30/413; G06V 30/414; G06V 30/1444; G06V 30/19193
See application file for complete search history.

(56) References Cited

U.S. PATENT DOCUMENTS 11,393,233 B2 *  7/2022  Tata ..................... G06N 3/0499

OTHER PUBLICATIONS

Xu, et al., LayoutLM: Pre-training of Text and Layout for Document Image Understanding, 2020, 9 pages, Association for Computing Machinery, (arxiv.org/abs/1912.13318).
Xu, et al., LayoutXLM: Multimodal Pre-training for Multilingual Visually-rich Document Understanding, Sep. 9, 2021, 10 pages, (arxiv.org/abs/2104.08836).

(Continued)

*Primary Examiner* — Daniel G Mariam
(74) *Attorney, Agent, or Firm* — Cesari and McKenna, LLP

(57) ABSTRACT

A computer-implemented method for adaptively discretizing a position of a textual object in a document includes receiving, by a computer system, an image of the document and determining, by the computer system, an absolute position of the textual object in the image of the document. The method further includes normalizing, by the computer system, the absolute position to determine a relative position of the textual object. The method also includes calculating, by the computer system, a bin size such that at least one axis of the image is divided into a plurality of separate bins, wherein a distance between each bin along the at least one axis and its adjacent bin equals the bin size. The method includes discretizing, by the computer system, the relative position based on the bin size to determine a discretized position of the textual object; and providing, by the computer system, the discretized position and a textual content of the textual object as an input to a machine learning model.

20 Claims, 5 Drawing Sheets

(56)     References Cited

OTHER PUBLICATIONS

Xu, et al., LayoutMv2: Multi-modal Pre-training for Visually-rich Document Understanding, Jan. 10, 2022 13 pages, (arxiv.org/abs/2012.14740).
Huang, et al., LayoutMv3: Pre-training for Document AI with Unified Text and Image Masking, Jul. 19, 2022, 10 pages, Association for Computing Machinery, (arxiv.org/pdf/2204.08387).

* cited by examiner

100

110 Receive image of document

120 Determine absolute position of textual object

130 Normalize absolute position

140 Calculate bin size

150 Discretize relative position

160 Provide discretized position and textual content to machine learning model

500

METHOD FOR ADAPTIVELY ENCODING POSITIONS OF TEXTUAL OBJECTS IN A DOCUMENT

BACKGROUND

Technical Field

The present invention relates to document processing by machine learning, and more particularly to encoding positions of textual objects in a document before processing the document with a language model.

Background

Common business transactions involve processing a variety of scanned documents such as purchase orders, financial reports, business emails, sales agreements, vendor contracts, letters, invoices, receipts, resumes, death certificates, beneficiary forms, checks, and many others. Even the most basic data extraction tool can help save 30-50% of employee time spent on manually extracting data from scanned documents. Even more time can be saved using advanced machine learning models to classify scanned documents and/or extract data from scanned documents. LayoutLM, described in arxiv.org/abs/1912.13318, which is incorporated by reference herein, and publicly available, is such an advanced model that considers both textual and layout information and is capable of accurate document image understanding and data extraction at scale across different use cases. Analyzing not only the textual information itself, but also its position on a page, helps with processing and classifying information from scanned documents such as forms.

For document image understanding, a pre-trained language model, LayoutLM or one of its variations LayoutXLM, LayoutLMv2, and LayoutLMv3 (described at arxiv.org/abs/2104.08836, arxiv.org/abs/2012.14740, and arxiv.org/abs/2204.08387, respectively, all of which are incorporated by reference herein, and also publicly available), models interactions between text and layout information across scanned document images and can achieve useful results for a wide number of real-world document image understanding tasks such as information extraction and document image classification. However, the 2D position embeddings LayoutLM uses for encoding the bounding box of a textual object are often too specific and not customizable, making the LayoutLM model less generalizable with regard to variations in bounding box position and very susceptible to noise. Specifically, the LayoutLM model is prone to overfit to certain location information and therefore may dilute the textual signal by overfocusing on its location.

SUMMARY

The deficiencies of the prior art are overcome by providing a method to encode the bounding box of a textual object so that its relative location on a page is customizable, allowing variation within a given range. By way of example, this range can be set through a parameter search process or automatically determined based on the word density for a given scanned document. The new encoding method described herein offers customizability, generalizability, and tolerance to noise, enabling LayoutLM to work on various levels of granularity. The improved method allows many document image understanding tasks, including but not limited to document type classification, information extraction from scanned documents, and scanned document image segmentation, to be executed with increased accuracy and generalizability. This also leads to higher accuracy and efficiency in transaction automation based on the scanned documents. While LayoutLM is used throughout this description to refer to a layout language model, it is expressly contemplated that any other known layout language model, such as LayoutXLM, LayoutLMv2, LayoutLMv3, or another model known to a person having skill in the art, may be used instead of or in addition to LayoutLM.

In accordance with one embodiment of the present invention, a computer-implemented method for adaptively discretizing a position of a textual object in a document, the method includes receiving, by a computer system, an image of the document and determining, by the computer system, an absolute position of the textual object in the image of the document. The method also includes normalizing, by the computer system, the absolute position to determine a relative position of the textual object. The method further includes calculating, by the computer system, a bin size such that at least one axis of the image is divided into a plurality of separate bins, wherein a distance between each bin along the at least one axis and its adjacent bin equals the bin size. The method includes discretizing, by the computer system, the relative position based on the bin size to determine a discretized position of the textual object; and providing, by the computer system, the discretized position and a textual content of the textual object as an input to a machine learning model.

Alternatively or in addition, the bin size is calculated based on a density of the document. The density may be determined based on at least one of a number of words in the document, a pixel density of the document, a font size in the document, a number of form fields in the document, and a resolution of the image of the document.

Also alternatively or in addition, the bin size is calculated based on a search selected from the group consisting of a brute force search, a random search, a dynamic search, and combinations thereof. The bin size may also be calculated based on a combination of a density of the document and at least one of a brute force search, a random search, and a dynamic search.

Further alternatively or in addition, the method further includes receiving, by the computer system, an output from the machine learning model; and calculating, by the computer system, an updated bin size based on the output. The output of the machine learning model may be selected from the group consisting of a classification of the document, a classification of the textual object, and combinations thereof.

Alternatively or in addition, the method includes fine-tuning the machine-learning model based on a parameter selected from the group consisting of the output of the model, the discretized position, the textual content, a desired output of the model, and combinations thereof.

The image of the document may be at least one of generated by a scanner, generated by a digital camera, and based on an electronic document. The absolute position of the textual object may be determined based on optical character recognition.

In accordance with another embodiment of the present invention, a system for adaptively discretizing a position of a textual object in a document includes a computing device having a processor coupled to a memory. The processor is configured to receive an image of the document and to determine an absolute position of the textual object in the image of the document. The processor is also configured to normalize the absolute position to determine a relative position of the textual object. The processor is further configured to calculate a bin size such that at least one axis of the image is divided into a plurality of separate bins, wherein a distance between each bin along the at least one axis and its adjacent bin equals the bin size. The processor is configured to discretize the relative position based on the bin size to determine a discretized position of the textual object. The processor is also configured to provide the discretized position and a textual content of the textual object as an input to a machine learning model.

Alternatively or in addition, the bin size is calculated based on a density of the document. The density may be determined based on at least one of a number of words in the document, a pixel density of the document, a font size in the document, a number of form fields in the document, and a resolution of the image of the document.

Also alternatively or in addition, the bin size is calculated based on a search selected from the group consisting of a brute force search, a random search, a dynamic search, and combinations thereof. The bin size may also be calculated based on a combination of a density of the document and at least one of a brute force search, a random search, and a dynamic search.

Further alternatively or in addition, the processor is further configured to receive an output from the machine learning model. The processor is also configured to calculate an updated bin size based on the output. The output of the machine learning model may be selected from the group consisting of a classification of the document, a classification of the textual object, and combinations thereof.

Alternatively or in addition, the processor is also configured to fine-tune the machine-learning model based on a parameter selected from the group consisting of the output of the model, the discretized position, the textual content, a desired output of the model, and combinations thereof.

In accordance with yet another embodiment of the present invention, a non-transitory computer-readable medium has software encoded thereon. The software, when executed by one or more computing devices coupled to a network, is operable to receive, by a computing device, an image of a document. The software is also operable to determine, by the computing device, an absolute position of a textual object in the image of the document. The software is operable to normalize, by the computing device, the absolute position to determine a relative position of the textual object. The software is further operable to calculate, by the computing device, a bin size such that at least one axis of the image is divided into a plurality of separate bins, wherein a distance between each bin along the at least one axis and its adjacent bin equals the bin size. The software is also operable to discretize, by the computing device, the relative position based on the bin size to determine a discretized position of the textual object. The software is operable to provide, by the computing device, the discretized position and a textual content of the textual object as an input to a machine learning model.

Alternatively or in addition, the bin size is calculated based on at least one of a density of the document, a brute force search, a random search, and a dynamic search.

BRIEF DESCRIPTION OF THE DRAWINGS

The description below refers to the accompanying drawings, of which.

4

Figure 2:
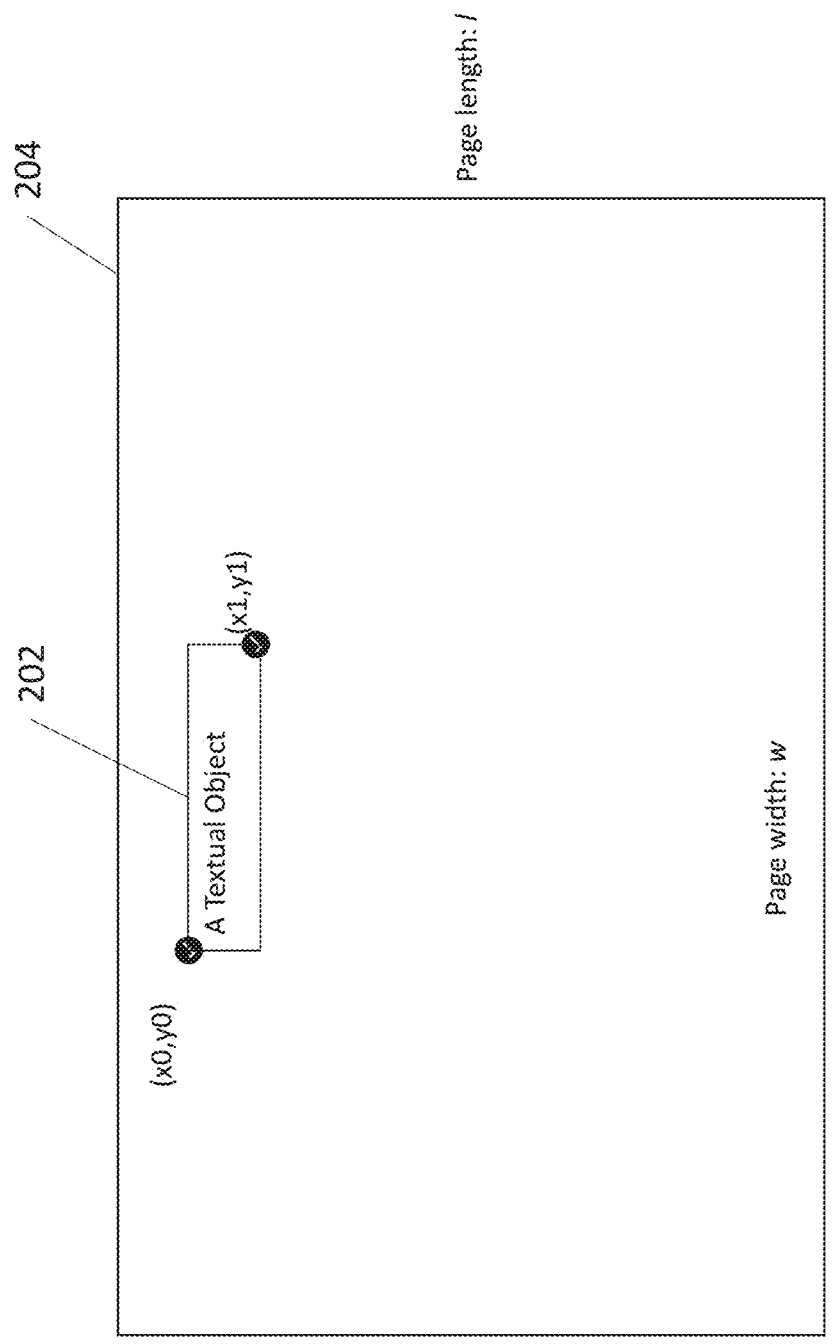
Figure 3:
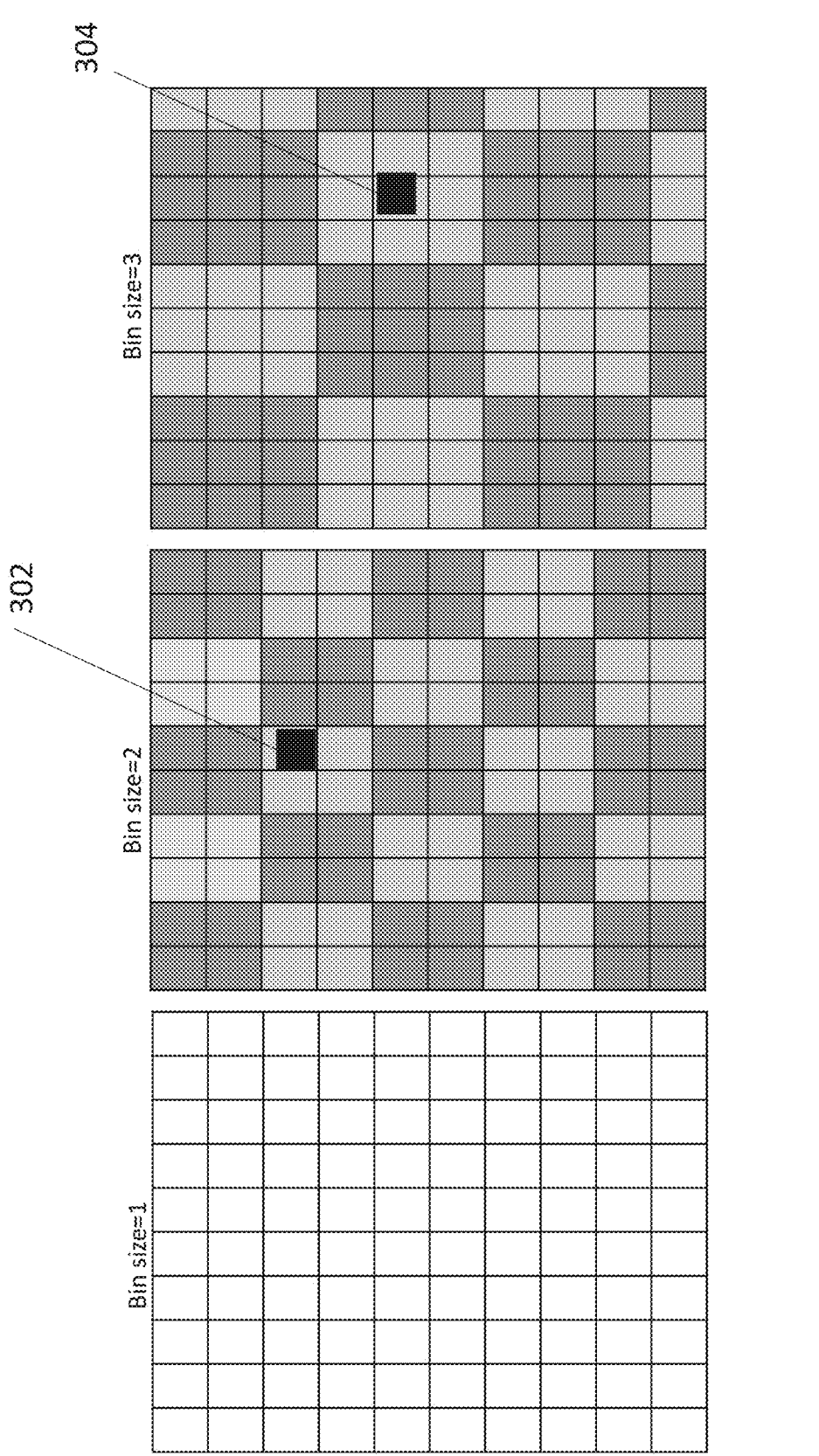
Figure 4:
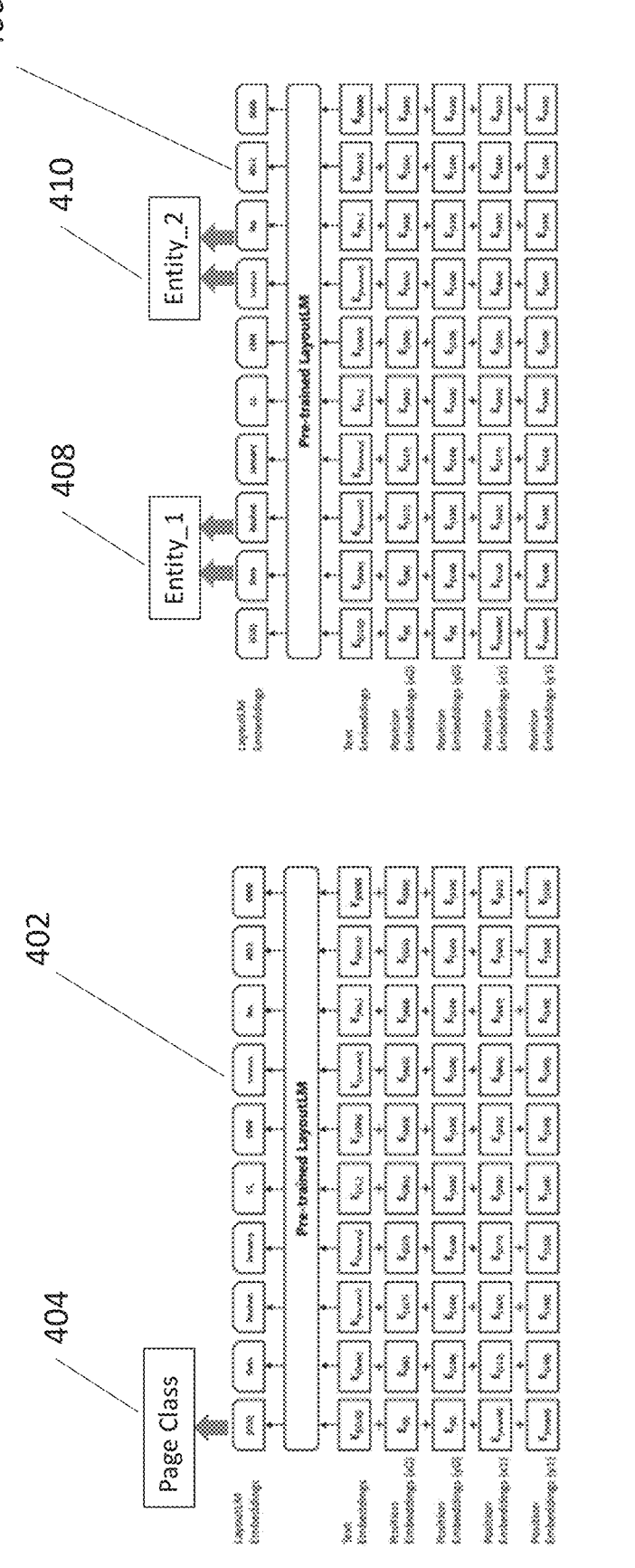
Figure 5:
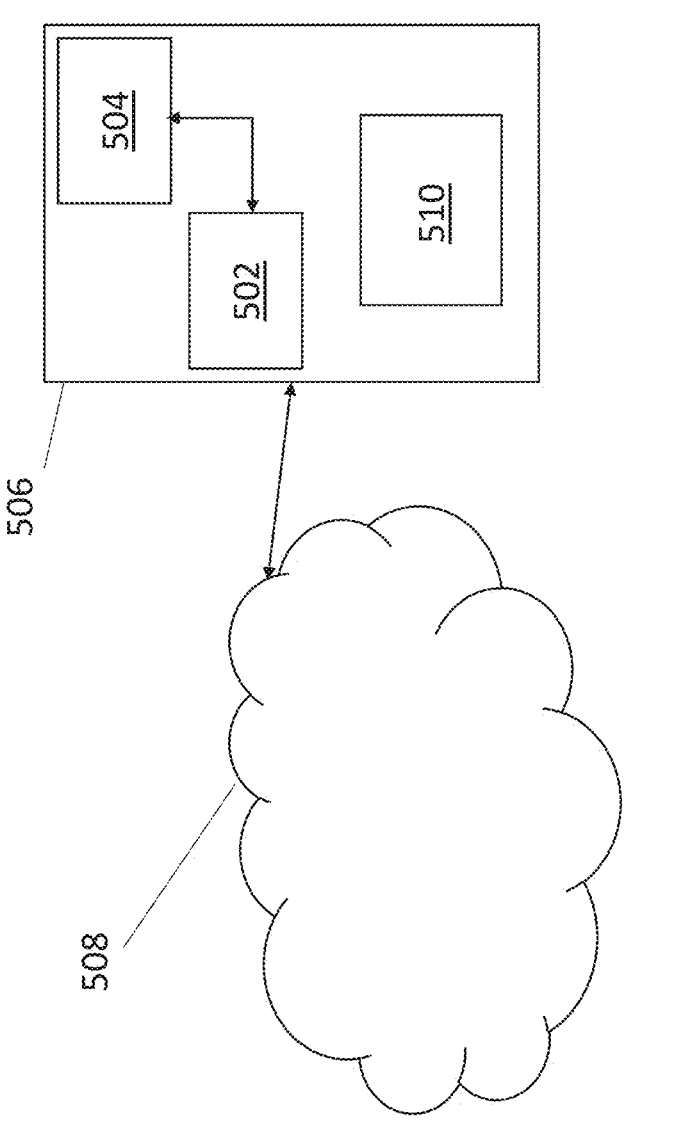

FIG. 2 is an illustration of a textual object in a document and its bounding box;

FIG. 3 is an illustration of different bin sizes;

FIG. 4 is an illustration of exemplary instances of machine learning models; and FIG. 5 is an illustration of a system for adaptively discretizing a position of a textual object in a document in accordance with an embodiment of the present invention.

DETAILED DESCRIPTION OF ILLUSTRATIVE EMBODIMENTS

Figure 1:
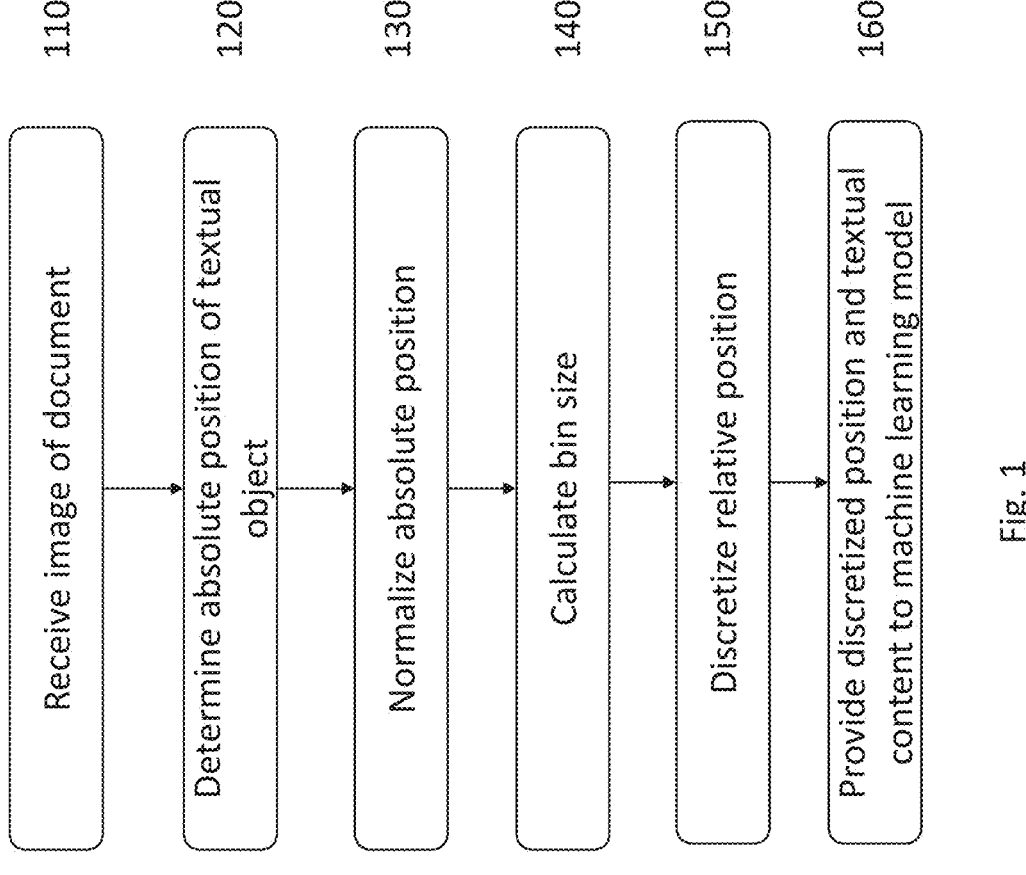
FIG. 1 is a flowchart of a method for adaptively discretizing a position of a textual object in a document in accordance with an embodiment of the present invention.

FIG. 1 is a flowchart of a method 100 for adaptively discretizing a position of a textual object in a document in accordance with an embodiment of the present invention. The computer-implemented method 100 may, for example, be executed by a processor of a computer system as shown below in FIG. 5.

In step 110, the computer system receives an image of a document. The image may have been produced by scanning the document with a scanner, photographing the document with a digital camera, or by any other known method that produces a digital image of a physical document. It is also expressly contemplated that the document may be a computer-generated document that never existed in physical form, i.e., an electronic document. In that case, the image of the document is either the electronic document itself or an image generated from the electronic document. The computer system may receive the image over a network, from a file system, from memory, or from any other transmission method known to the skilled person.

In step 120, the computer system determines an absolute position of a textual object in the document. FIG. 2 illustrates such an absolute position of a textual object 202 on a document page 204. The page 204 has a length l and a width w. The page length l and the page width w may be defined by the resolution of the scanned image. For example, if the scanned image of the document has a resolution of 1000× 3000 pixels, the page width w is 1000 pixels and the page length l is 3000 pixels. In another example, page length l and page width w may be defined by the physical properties of the document that was scanned. For example, for a letter-sized document the page length l may be 11 inches, and the page width w may be 8.5 inches. The textual object 202 has a rectangular bounding box that is defined by the coordinates of the upper left corner and the coordinates of the lower right corner. In the example shown in FIG. 2, the absolute coordinates of the upper left corner are (x0, y0) and the absolute coordinates of the lower right corner are (x1, y1). Therefore, the absolute position of the bounding box of the textual object 202 is defined by the coordinates (x0, y0) and (x1, y1). The coordinates x0 and x1 may take any value between 0 and the page width w. The coordinates y0 and y1 make take any value between 0 and the page length l. Illustratively, the textual objects and their bounding boxes are extracted from a scanned document image using optical character recognition (OCR). Any OCR algorithm and/or software known to the skilled person may be used to extract the textual objects and their bounding boxes. One cloud-based example for OCR software that extracts textual objects and their positions on a page is Amazon Textract, available at aws.amazon.com/textract/.

In step 130, the computer system normalizes the absolute position of the textual object to generate a relative position of the textual object. To this end, the absolute coordinates of the bounding box (x0, y0) and (x1, y1) are divided by the dimensions of the page, l and w, to generate a value between 0 and 1. The coordinates x0 and x1 are divided by the page width w, and the coordinates y0 and y1 are divided by the page length l. After the division, the computer system multiplies the generated value by 1000 to result in an integer number between 0 and 1000. The normalization step thus generates a relative position of the bounding box of the textual object 202. The relative position may, for example, be given in relative coordinates (m0, n0) for the upper left corner and (m1, n1) for the lower right corner, with each of m0, n0, m1, and n1 being an integer number between 0 and 1000.

In step 140, the computer system calculates a bin size such that at least one axis of the image is divided into a plurality of separate bins. A distance between each bin along the at least one axis and its adjacent bin equals the bin size. While the bin size described herein is the same for both axes, it is expressly contemplated that the bin size for the x axis may be different from the bin size for the y axis. Dividing the image into separate bins provides a discretization step. Relative coordinates that fall into the same bin share the same discretized coordinate values. FIG. 3 illustrates the discretization for bin sizes of 1, 2, and 3 using relative coordinates between 1 and 10. For bin size 1, the output of the discretization is the same as if no discretization had happened. In other words, the discretized coordinates are the same as the relative coordinates. For bin size 2, two adjacent relative coordinate positions on each axis are grouped together into one bin. In the example shown in FIG. 3, the relative coordinates ranging from 1 to 10 are grouped into 5 bins on each axis. Relative coordinates 1 and 2 are grouped into bin 1, relative coordinates 3 and 4 are grouped into bin 2, relative coordinates 5 and 6 are grouped into bin 3, relative coordinates 7 and 8 are grouped into bin 4, and relative coordinates 9 and 10 are grouped into bin 5. For bin size 3, three adjacent relative coordinate positions are grouped together to form bins. In the example shown in FIG. 3, relative coordinates 1, 2, and 3 are grouped into bin 1, relative coordinates 4, 5, and 6 are grouped into bin 2, relative coordinates 7, 8, 9 and grouped into bin 3, and relative coordinate 10 forms bin 4. As can be seen, if the page length and/or width cannot be equally divided into bins of the same size, at least one bin may have a different size than the other bins.

In step 150, the computer system discretizes the relative coordinates of the bounding box of the textual object using the bins determined in step 140. Using the example shown in FIG. 3, for a bin size of 2 the relative coordinate 302 of (6,3) is discretized to result in a discretized coordinate of (5,3). For a bin size of 3, the relative coordinate 304 of (8,5) is discretized to result in a discretized coordinate of (7,4). As can be seen, the discretized coordinates are the coordinates of the upper left corner of the respective bin. For bin size 3, a relative coordinate of (8,6) would therefore also result in a discretized coordinate of (7,4).

The same discretization can be performed using the full range of relative coordinates from 0 to 1000. For example, if the bin size is determined to be 250, the range of the relative coordinates is separated into four bins, each of size 250. Exemplary relative coordinates (51, 123) and (321, 848) are then discretized, using the bins of size 250, to (0,0) and (250, 750). Again, the discretized coordinates are the coordinates of the upper left corner of the respective bin. In another example, relative coordinates (240, 300) and (475, 900) are discretized to (0, 250) and (250, 750).

In step 160, the computer system provides the discretized coordinates of the bounding box and the textual content as an input to a machine learning model such as a layout language model. The machine learning model may be any known deep-learning model that incorporates text and spatial information for text processing and classification, such as but not limited to LayoutLM. Advantageously, a well-selected bin size helps the layout language model to be more generalizable, less perturbed by position noises, with increased performance in downstream document image understanding tasks.

Determination of the bin size can be performed by any regular hyperparameter optimization technique known to the skilled person. For example, the computer system may evaluate the results of the document understanding task that the model performs for different bin sizes. Illustratively, the computer system determines the bin size by a brute force search from 1 to the maximum possible relative coordinate (1000 in the example above). For each bin size from 1 to 1000 the computer system then trains the model and performs the document understanding task, such as document classification or entity recognition, for a given set of documents (the validation set), and evaluates the result. For example, cross-validation may be used to evaluate the performance of the model. As a result of the evaluation, a score is determined. For example, the score may be between 0 and 1 and may indicate how well the documents in the set of documents have been classified (with 1 indicating the best result). The scores are recorded for each different bin size. Finally, the bin size that led to the best score is selected as the bin size to be used in the algorithm. If two hyperparameters are to be determined, a grid search, a two-dimensional version of the brute force search, may be used to determine the optimal values of the hyperparameters. To this end, the hyperparameter space (or a subset thereof) is divided into a discrete grid. For each point in the grid, i.e., for each combination of the two parameters, the model is trained and evaluated using the respective parameter combination. The evaluation results are recorded for each grid point. The combination of hyperparameters that led to the best result is selected to be used in the algorithm. Alternatively or in addition to a brute force search and/or grid search, the computer system may also determine the bin size by a random search. In that case, as opposed to training and evaluating the model for each bin size in the search space, the computer system randomly selects a pre-determined number of bin sizes, trains and evaluates the model for each one of these selected bin sizes, and calculates a score as described above. In a simple example using bin sizes from 0 to 1000 and a desired number of 10 bin sizes, the computer system may evaluate bin sizes 19, 111, 276, 480, 512, 635, 642, 805, 890, and 955. For each one of these bin sizes, the computer system trains the model, performs the document understanding task for the validation set, and evaluates the result as represented by a score. The bin size that led to the best score is selected as the bin size to be used in the algorithm. The advantage of the random search over brute force or grid search is that it is much faster if the search space is large. However, the optimal bin size may be missed if it is not one of the selected randomly determined samples. Alternatively or in addition, any other method to tune hyperparameters known to the skilled person may be used, for example a dynamic search or a Bayesian search.

Specifically, and as known to the skilled person, dynamic search involves adjusting the bin size during training based on the machine learning model's performance for the document understanding task on the validation set. The performance on the validation set is then used to guide the search for the bin size to be used in the algorithm. This approach may be more efficient than a brute force search or random search, because it avoids spending computational resources on bin sizes that are unlikely to improve the performance of the machine learning model. A common way to implement a dynamic search is Bayesian optimization. Bayesian optimization uses a probabilistic model to predict the performance of different hyperparameters, such as the bin size, and guides the search towards regions of the hyperparameter space that improve the performance of the machine learning model. Another approach to implement a dynamic search is to use a gradient-based optimization algorithm, such as stochastic gradient descent, to update the bin size (and/or other hyperparameters) during training. The hyperparameters are treated as variables, and their gradients with respect to the loss function of the machine learning model are computed during backpropagation. The hyperparameters are then updated using the gradients, similar to how the parameters of the model are updated. Detailed descriptions of Bayesian optimization and gradient-based optimization are publicly available, for example at en.wikipedia.org/wiki/Hyperparameter_optimization, which is incorporated herein by reference in its entirety.

The bin size may also be selected heuristically using page density indicators, such as the number of words per page. If a page is dense, i.e., the number of words on the page is high, a smaller bin size may be selected for finer granularity. If a page is sparse, i.e., the number of words on the page is low, a larger bin size may be selected for coarser granularity. Alternatively or in addition, density may be determined based on pixel density. If a black-and-white page includes a high number of black pixels, the page is considered dense. If it includes a low number of black pixels, the page is considered sparse. Also alternatively or in addition, density may be determined based on font size, spacing between words, the number of fields in a form, the resolution of the image, or in any other suitable way known to the skilled person. The determination of whether a page is dense or sparse may be performed based on preselected thresholds for words and/or pixels. These thresholds may be determined based on the specific use case, the type of documents to be analyzed, or any other specifications or requirements of the document image understanding task at hand.

It is also expressly contemplated that a combination of different methods to determine the step size may be used. For example, the step size may be determined by a brute force search or a grid search within a specific range that is selected using the properties of the document. Illustratively, for a dense document, the brute force search may evaluate a bin size range of 1 to 10, and for a sparse document the brute force search may evaluate a bin size range of 50 to 100.

It is further contemplated that the computer system, after executing the machine learning model, receives an output from the model. The output may be a classification of the document page 204, a classification of the textual object 202, or it may be a classification of both the document page 204 and the textual object 202. Alternatively or in addition, the output may include a metric for evaluating the model, such as probability of the classification, accuracy of the classification, or any other suitable metric known to the skilled person. The output may be evaluated and used to update the bin size. In other words, the computer system may calculate an updated bin size based on the output of the model. By way of example, if the model output using a specific bin size is worse than the model output using a different bin size, or using a bin size of 1 to effectively disable discretization, the computer system may calculate an updated bin size. In another example, if the algorithm has been increasing the bin size but the model output is becoming gradually worse, the algorithm may decrease the bin size to counteract the worsening results. In a third example, the computer system may also update the bin size if the classification remains the same, but the probability of the classification becomes worse. If increasing the bin size does not change the classification received from the model, but the probability of that classification is reduced from 0.9 to 0.6, the algorithm may decrease the bin size to counteract the worsening probability. This update of the bin size may be part of an explicit brute force or grid search, or it may be performed to fine-tune the model after the hyperparameters have been initially determined. In addition to basing the fine-tuning on the output of the model, it may also be based on the discretized position of the textual object, the textual content of the textual object, a desired output of the model (as compared to the actual output of the model) or a combination of these parameters. The fine-tuning of the model may be a tuning of the hyperparameters of the model itself, which depend on which language model is chosen, and/or it may also be a fine-tuning of the bin size as described above.

The method described herein has been evaluated using two different document understanding tasks: a document classification task and an entity classification task. In the document classification task, the machine learning model was trained to classify an image of a scanned document into one of five page types: blank page, main form page, signature page, spousal consent page, and supporting document page. The dataset used for training and evaluation consisted of 620 document images, i.e. 620 document pages. Five-fold cross-validation was performed. That means that the 620 pages were divided into 5 subsets of 124 pages each. The model was trained using 4 of the 5 subsets and, after that, validated using the remaining fifth subset. The evaluation was performed five times, each time rotating the training and validation subsets. The results for the LayoutLM model without additional discretization and for the LayoutLM model with the discretization method described herein are shown in the table below:

| | Fold 1 | Fold 2 | Fold 3 | Fold 4 | Fold 5 | Average |
|---|---|---|---|---|---|---|
| LayoutLM without discretization | 0.9437 | 0.9682 | 0.9562 | 0.9532 | 0.9178 | 0.94782 |
| LayoutLM with discretization | 0.9759 | 0.9758 | 0.9641 | 0.9694 | 0.9203 | 0.9611 |

The given values represent average weighted $F_1$ scores, with the highest possible value being 1.0 and indicating perfect precision. As can be seen, performing the discretization described herein improves the classification results of the machine learning model as indicated by the improved $F_1$ score.

In the entity classification task, the machine learning model was trained to identify seven entities in synthetic medical bills: payment amount, total amount, payment address, provider address, bill number, customer name, and bill phone number. The model was trained to identify both the values of these seven entities and their related labels. Before providing them to the model, the textual entities and their bounding boxes were extracted from images of synthetic medical bills using OCR software such as Amazon Textract. The model was trained on 1,500 synthetic medical bills and tested on 1,000 different synthetic medical bills. The accuracy of correct extraction for the different entities is shown in the table below:

| | LayoutLM without discretization | LayoutLM with discretization |
|---|---|---|
| payment amount | 0.978 | 0.979 |
| total amount | 0.971 | 0.978 |
| payment address | 0.781 | 0.892 |
| provider address | 0.824 | 0.890 |
| bill number | 0.754 | 0.816 |
| customer name | 0.918 | 0.930 |
| bill phone number | 0.973 | 0.989 |
| label: payment amount | 0.993 | 0.996 |
| label: total amount | 0.991 | 0.995 |
| label: payment address | 0.991 | 0.995 |
| label: provider address | 0.995 | 0.996 |
| label: bill number | 0.927 | 0.936 |
| label: customer name | 0.994 | 0.996 |
| label: bill phone number | 0.975 | 0.994 |

As before, higher numbers indicate more accurate extraction, with 1.0 being the best possible value. As can be seen, adding the discretization described herein improved extraction accuracy for each one of the seven entities and also for each one of the associated labels. Overall, the extraction accuracy improved from 0.933 without discretization to 0.953 with discretization. The extraction accuracy of some entities, such as the payment address, improved by more than 10%.

FIG. 4 illustrates two exemplary instances of machine learning models performing a document classification task and an entity classification task. Illustratively, machine learning model 402 was trained to classify an image of a scanned document. To perform the classification task, model 402 receives 10 text embeddings and associated position embeddings as inputs. As known to the skilled person, these embeddings are low-dimensional, learned continuous-vector representations of discrete variables, such as words and bounding box coordinates. As described in detail above, the text and position embeddings may be generated by OCR. The position embeddings then may be further discretized and optimized by the method described herein. The model 402 outputs the most probably class of the image as one of its output embeddings, namely page class 404. In another example, machine learning model 406 was trained to classify textual objects into one of several entities. To perform the classification task, model 406 also receives 10 text embeddings and associated position embeddings as inputs. As with model 402, the text and position embeddings may be generated by OCR, and the position embeddings may be further discretized and optimized by the method described herein. The model 406 outputs the most probable entity class for each one of the text embeddings, which include both values and labels of a form. Illustratively, the model 406 outputs the most probably entity classes for a first entity 406 (including a form value and its associated label) and a second entity 408 (also including a form value and its associated label).

FIG. 5 is an illustration of a system 500 for adaptively discretizing a position of a textual object in a document in accordance with an embodiment of the present invention. A computer system 506 includes a processor 502 coupled to memory 504. The computer system 506 may be coupled to a network 508. The network 508 may be the internet, or it may be any other public or private network. Also residing in the computer system 506 is a machine learning model 510.

The machine learning model 510 may be stored in the memory 504 and may be executed by the processor 502, or it may be a separate entity within the computer system 506. It is also expressly noted that the machine learning model 510 may not reside in the computer system 506 but may reside in a different entity that is also coupled to the network 508. In that case, the computer system 506 would communicate with the machine learning model 510 via the network 508. The processor 504 of the computer system 506 is configured to execute the method described in detail above with reference to FIG. 1.

Illustratively, the machine learning model 510 may be a layout language model such as LayoutLM, LayoutXLM, LayoutLMv2. or LayoutLMv3 described above. The machine learning model may be pre-trained on textual entities and their bounding boxes as they are found in forms. For example, the LayoutLM model, as publicly available, is pre-trained on 11 million invoices and forms. The machine learning model 510 consumes both text and positions and provides page classification or entity recognition as an output. However, it is expressly noted that the model 510 may also provide outputs other than or additional to page classification or entity recognition.

Embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A computer-implemented method for adaptively discretizing a position of a textual object in a document, the method comprising:

receiving, by a computer system, an image of the document;

automatically determining, by the computer system, an absolute position of the textual object in the image of the scanned document based upon a pixel resolution of the image, the absolute position comprising pixel-based x-y coordinates defining a bounding box around the textual object;

normalizing, by the computer system, the absolute position based upon the pixel resolution of the image to generate a relative position of the textual object;

calculating, by the computer system, a bin size such that at least one axis of the image is divided into a plurality of separate bins, wherein a distance between each bin along the at least one axis and its adjacent bin equals the bin size;

discretizing, by the computer system, the relative position based on the bin size to determine a discretized position of the textual object; and providing, by the computer system, the discretized position and a textual content of the textual object as an input to a machine learning model.

2. The computer-implemented method of claim 1, wherein the bin size is calculated based on a density of the document.

3. The computer-implemented method of claim 2, wherein the density is determined based on at least one of a number of words in the document, a pixel density of the document, a font size in the document, a number of form fields in the document, and a resolution of the image of the document.

4. The computer-implemented method of claim 1, wherein the bin size is calculated based on a search selected from the group consisting of a brute force search, a random search, a dynamic search, and combinations thereof.

5. The computer-implemented method of claim 1, wherein the bin size is calculated based on a combination of a density of the document and at least one of a brute force search, a random search, and a dynamic search.

6. The computer-implemented method of claim 1, further comprising:

receiving, by the computer system, an output from the machine learning model; and calculating, by the computer system, an updated bin size based on the output.

7. The computer-implemented method of claim 6, wherein the output of the machine learning model is selected from the group consisting of a classification of the document, a classification of the textual object, and combinations thereof.

8. The computer-implemented method of claim 6, further comprising fine-tuning the machine-learning model based on a parameter selected from the group consisting of the output of the model, the discretized position, the textual content, a desired output of the model, and combinations thereof.

9. The computer-implemented method of claim 1, wherein the image of the document is at least one of generated by a scanner, generated by a digital camera, and based on an electronic document.

10. The computer-implemented method of claim 1, wherein the absolute position of the textual object is determined based on optical character recognition.

11. A system for adaptively discretizing a position of a textual object in a document, the system comprising:

a computing device having a processor coupled to a memory, the processor configured to:

receive an image of the document;

automatically determine an absolute position of the textual object in the image of the scanned document based upon a pixel resolution of the image, the absolute position comprising pixel-based x-y coordinates defining a bounding box around the textual object;

normalize the absolute position based upon the pixel resolution of the image to generate a relative position of the textual object;

calculate a bin size such that at least one axis of the image is divided into a plurality of separate bins, wherein a distance between each bin along the at least one axis and its adjacent bin equals the bin size;

discretize the relative position based on the bin size to determine a discretized position of the textual object; and provide the discretized position and a textual content of the textual object as an input to a machine learning model.

12. The system of claim 11, wherein the bin size is calculated based on a density of the document.

13. The system of claim 12, wherein the density is determined based on at least one of a number of words in the document, a pixel density of the document, a font size in the document, a number of form fields in the document, and a resolution of the image of the document.

14. The system of claim 11, wherein the bin size is calculated based on a search selected from the group consisting of a brute force search, a random search, a dynamic search, and combinations thereof.

15. The system of claim 11, wherein the bin size is calculated based on a combination of a density of the document and at least one of a brute force search, a random search, and a dynamic search.

16. The system of claim 11, wherein the processor is further configured to:

receive an output from the machine learning model; and calculate an updated bin size based on the output.

17. The system of claim 16, wherein the output of the machine learning model is selected from the group consisting of a classification of the document, a classification of the textual object, and combinations thereof.

18. The system of claim 16, wherein the processor is further configured to fine-tune the machine learning model based on parameter selected from the group consisting of the output of the model, the discretized position, the textual content, a desired output of the model, and combinations thereof.

19. A non-transitory computer-readable medium having software encoded thereon, the software, when executed by one or more computing devices operable to:

receive, by a computing device, an image of a document;

automatically determine, by the computing device, an absolute position of the textual object in the image of the scanned document based upon a pixel resolution of the image, the absolute position comprising pixel-based x-y coordinates defining a bounding box around the textual object;

normalize, by the computing device, the absolute position based upon the pixel resolution of the image to generate a relative position of the textual object;

calculate, by the computing device, a bin size such that at least one axis of the image is divided into a plurality of separate bins, wherein a distance between each bin along the at least one axis and its adjacent bin equals the bin size;

discretize, by the computing device, the relative position based on the bin size to determine a discretized position of the textual object; and provide, by the computing device, the discretized position and a textual content of the textual object as an input to a machine learning model.

20. The non-transitory computer-readable medium of claim 19, wherein the bin size is calculated based on at least one of a density of the document, a brute force search, a random search, and a dynamic search.

* * * * *